(12) United States Patent
Kim et al.

(10) Patent No.: US 9,061,565 B2
(45) Date of Patent: Jun. 23, 2015

(54) AIR CONDITIONER FOR VEHICLE

(75) Inventors: Jongsu Kim, Daejeon-si (KR); Sooyong Jin, Daejeon-si (KR)

(73) Assignee: Halla Visteon Climate Control Corp., Daejeon (KR)

( * ) Notice: Subject to any disclaimer, the term of this patent is extended or adjusted under 35 U.S.C. 154(b) by 745 days.

(21) Appl. No.: 13/218,493

(22) Filed: Aug. 26, 2011

(65) Prior Publication Data
US 2012/0057972 A1  Mar. 8, 2012

(30) Foreign Application Priority Data
Sep. 6, 2010 (KR) .................. 10-2010-0087096

(51) Int. Cl.
*F01D 25/24* (2006.01)
*B60H 1/00* (2006.01)

(52) U.S. Cl.
CPC ........ *B60H 1/00507* (2013.01); *B60H 1/00514* (2013.01); *B60H 2001/00628* (2013.01)

(58) Field of Classification Search
CPC ........... B60H 1/00507; B60H 1/00514; B60H 2001/00628
USPC ............................. 417/423.1, 423.14; 415/206
See application file for complete search history.

(56) References Cited

U.S. PATENT DOCUMENTS

| | | | |
|---|---|---|---|
| 2002/0129932 A1* | 9/2002 | Nagata et al. | 165/202 |
| 2002/0154993 A1 | 10/2002 | Kamiya et al. | |
| 2006/0177322 A1* | 8/2006 | Lipa et al. | 417/423.1 |
| 2006/0260783 A1 | 11/2006 | Park et al. | |
| 2007/0238406 A1* | 10/2007 | Jeong et al. | 454/139 |

FOREIGN PATENT DOCUMENTS

| | | | | |
|---|---|---|---|---|
| JP | 8164728 A | 6/1996 | | |
| JP | 08-268037 | 10/1996 | | |
| JP | 8268037 A | 10/1996 | | |
| JP | 08268037 A | * 10/1996 | ............... | B60H 1/00 |
| JP | 2002-347430 A | 12/2002 | | |
| JP | 2004249921 A | 9/2004 | | |
| KR | 1020060010493 A | 2/2006 | | |
| KR | 20080078280 A | 8/2008 | | |
| KR | 102008007828 0 | * 8/2008 | | |
| KR | 102009006340 A | 6/2009 | | |

* cited by examiner

*Primary Examiner* — Peter J Bertheaud
*Assistant Examiner* — Dominick L Plakkoottam
(74) *Attorney, Agent, or Firm* — Norton Rose Fulbright US LLP (57) ABSTRACT

The present invention relates to an air conditioner for a vehicle, which includes coupling portions formed on both sides of a scroll case, a connection cover coupled to one coupling portion and having an inlet ring and a dual ring, a motor housing coupled to the other coupling portion of the scroll case, air holes respectively formed on faces at the same height as both sides of a discharge part of the scroll case, and a blocking portion formed on the connection cover to close one of the air holes. The air conditioner can reduce investment costs, development expenses and the development period of time because all parts excepting an intake duct can be used commonly in RHDs (Right Handle Drives) and LHDs (Left Handle Drives) and can reduce a loss of air volume because air holes for cooling a motor are formed at positions to minimize resistance of the air discharged from a scroll case.

13 Claims, 9 Drawing Sheets

Fig.1

Prior Art

Amended

Fig.9

AIR CONDITIONER FOR VEHICLE

RELATED APPLICATIONS

This application claims priority under 35 U.S.C. §119 from Korean Patent Application No. 10-2010-0087096 filed Sep. 6, 2010, incorporated herein by reference in its entirety for all purposes.

BACKGROUND OF THE INVENTION

1. Field of the Invention

The present invention relates to an air conditioner for a vehicle, and more particularly, to an air conditioner for a vehicle, which can reduce investment costs, development expenses and the development period of time because all parts excepting an intake duct can be used commonly in RHDs (Right Handle Drives) and LHDs (Left Handle Drives), and which can reduce a loss of air volume because air holes for cooling a motor are formed at positions to minimize resistance of the air discharged from a scroll case.

2. Background Art

In general, an air conditioner for a vehicle is to cool or heat the inside of the vehicle by sending the inside air or the outside air of the vehicle after heating or cooling the air. The air conditioner for the vehicle includes an air-conditioning case that has an evaporator, a heater core, and an air mode converting door therein, wherein the evaporator functions to cool the air, the heater core functions to heat the air, and the air mode converting door selectively blow the air cooled by the evaporator or the air heated by the heater core to each part inside the vehicle.

According to mounted structures of a blower unit, an evaporator unit and a heater core unit, such an air conditioner is classified into a three-piece type air conditioner where the blower unit, the evaporator unit, and the heater core unit are disposed independently, a semi-center type air conditioner where the evaporator unit and the heater core unit are embedded in an air-conditioning case and the blower unit is mounted separately, and a center-mounting type air conditioner where the three units are all embedded in the air-conditioning case.

In the meantime, in order to increase efficiency of the interior space of the vehicle, consumers demand compact and small-sized air conditioners, and conventionally, in response to the consumers' demand, the semi-center type air conditioners where the evaporator unit and the heater core unit are formed integrally in an air-conditioning case were mainly used.

However, recently, development of the center-mounting type air conditioners where the blower unit, the evaporator unit, and the heater core unit are mounted integrally with one another is on the increase. As an example, FIG. 1 illustrates such a center-mounting type air conditioner.

Figure 1:
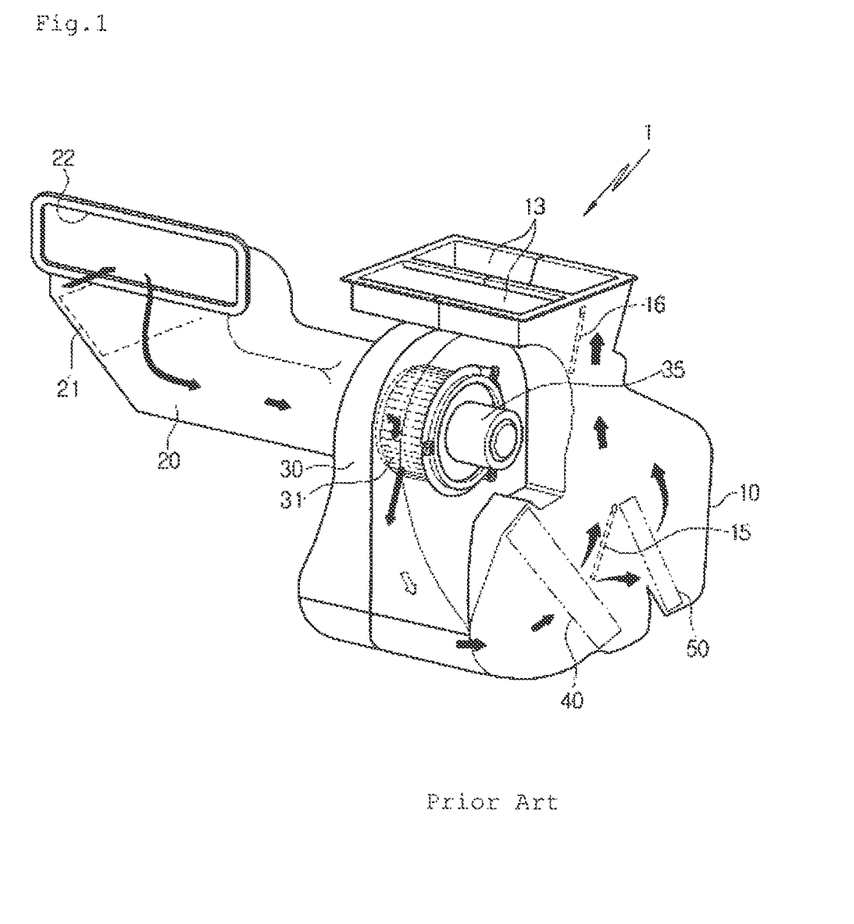
FIG. 1 is a perspective view of an air conditioner for a vehicle according to a prior art.
Figure 2:
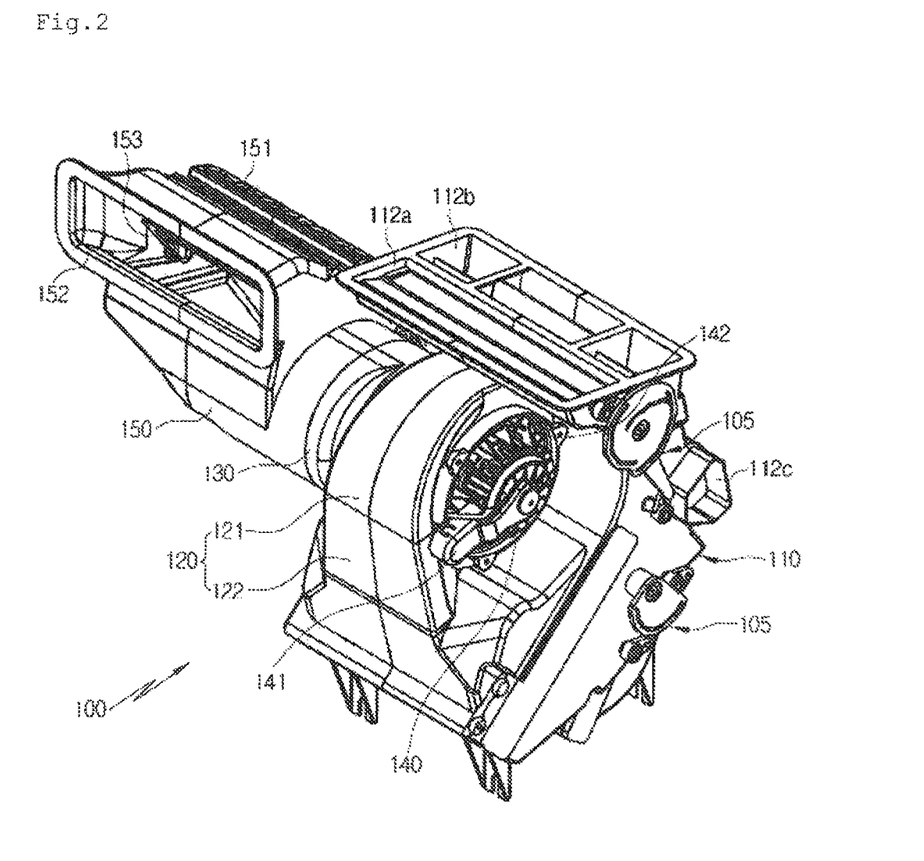
FIG. 2 is a perspective view of an air conditioner for a vehicle according to the present invention.
Figure 3:
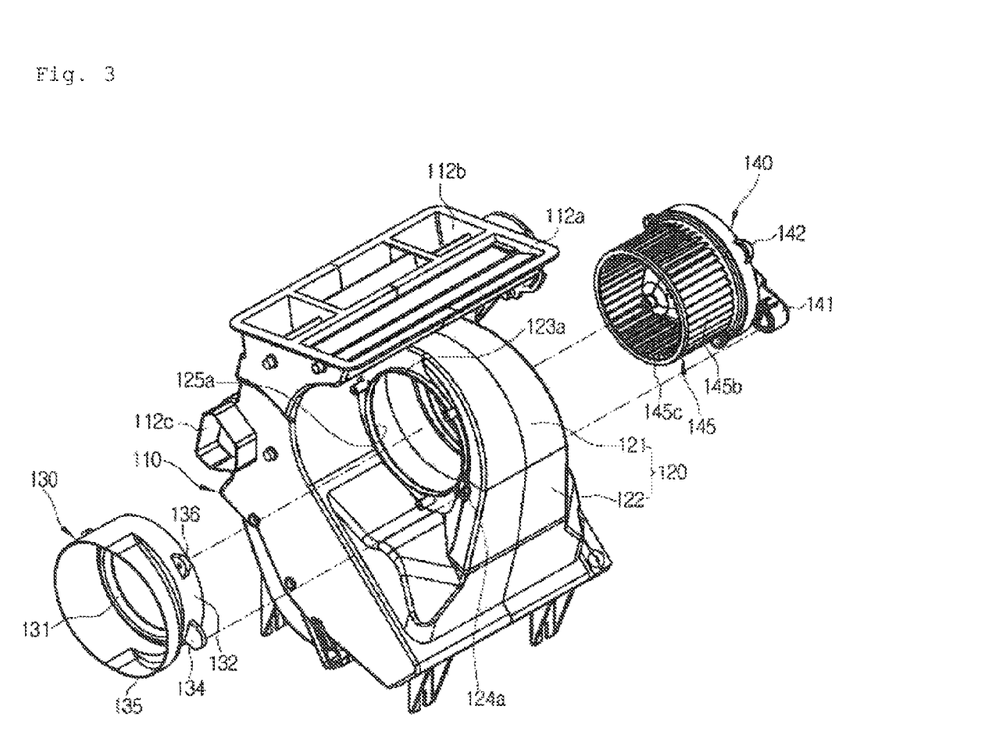
FIG. 3 is a perspective view showing a state where a connection cover and a motor housing are disassembled from a scroll case of the air conditioner for the vehicle according to the present invention.
Figure 4:
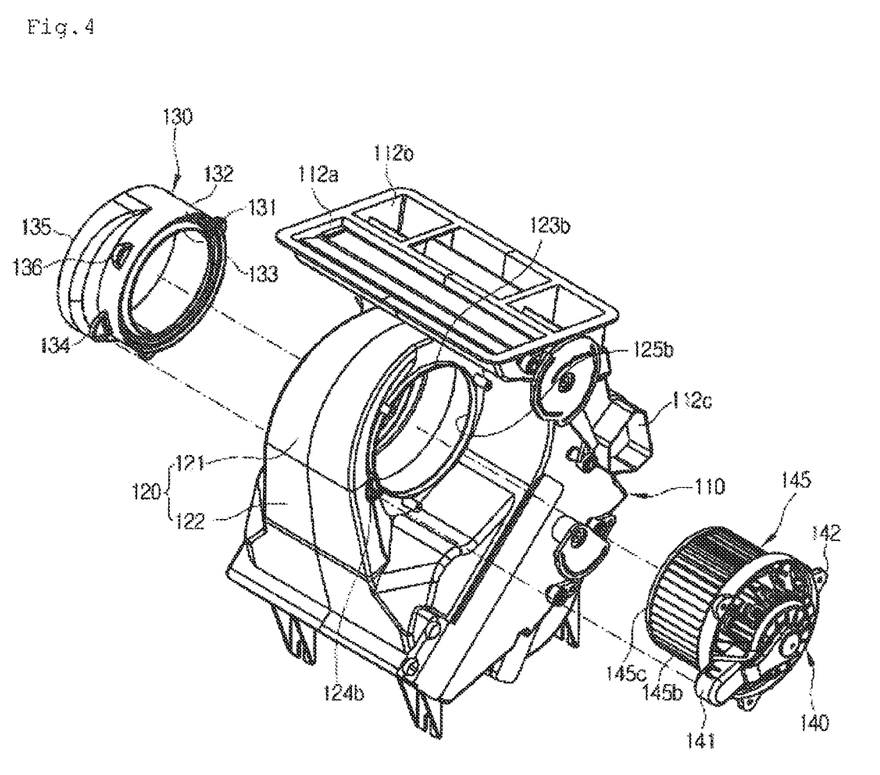
FIG. 4 is a perspective view of the air conditioner for the vehicle viewed from a direction different from FIG. 3.
Figure 5:
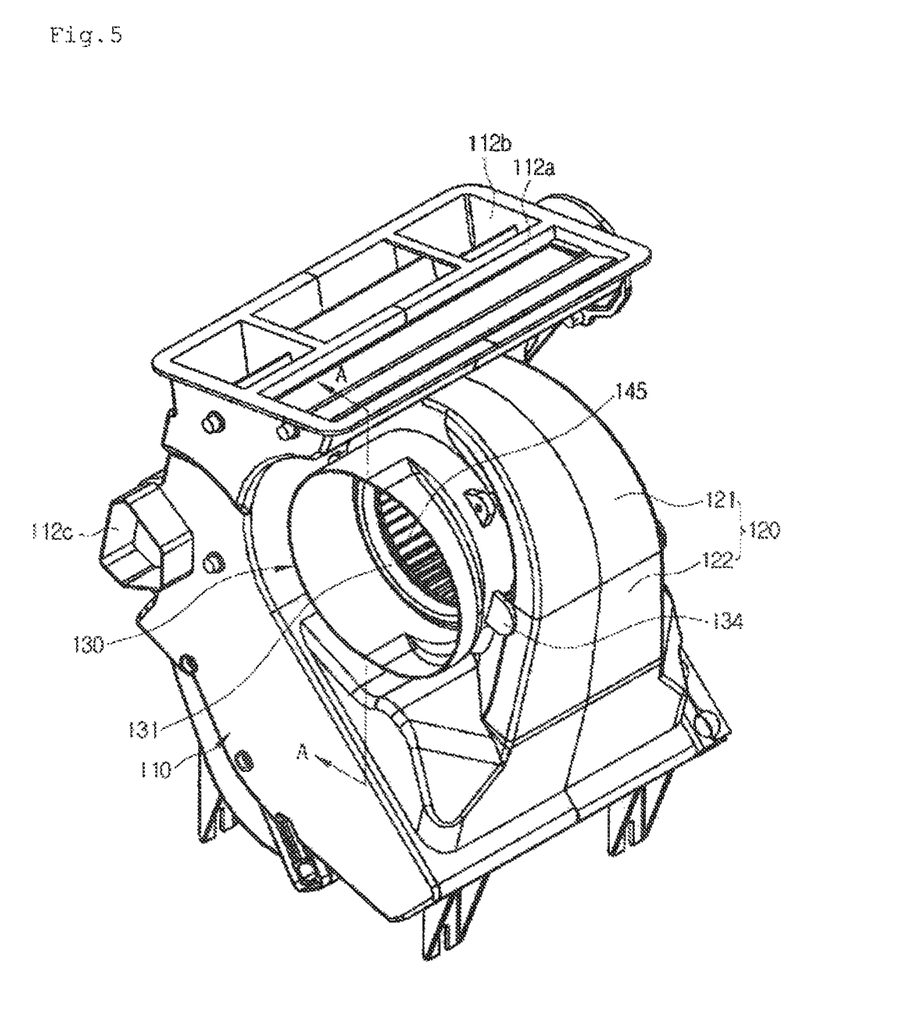
FIG. 5 is a perspective view showing a state where the connection cover is coupled to the scroll case of the air conditioner for the vehicle according to the present invention.
Figure 6:
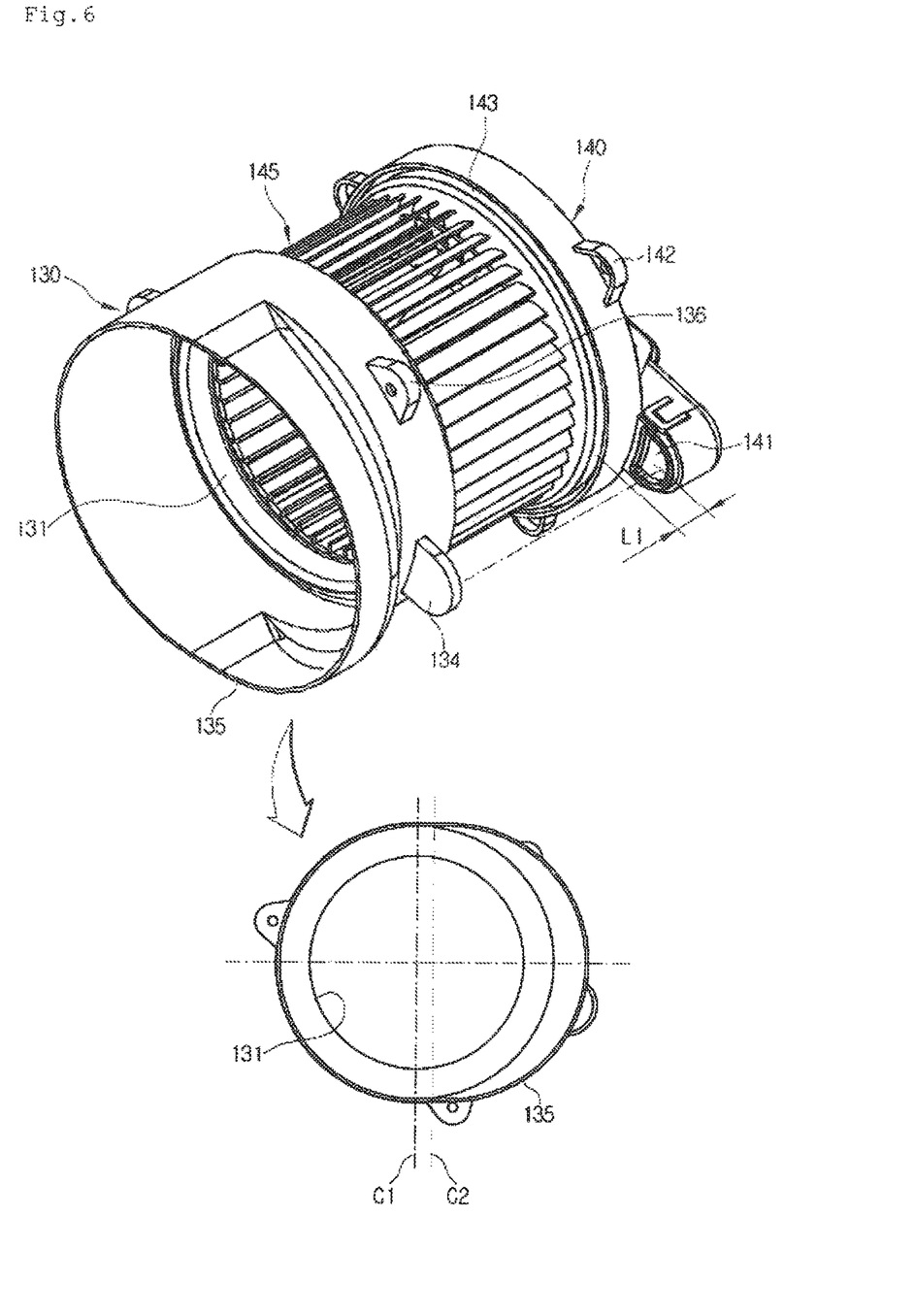
FIG. 6 is a perspective view showing the connection cover, a centrifugal fan, and the motor housing in a state where the scroll case is removed from the air conditioner for the vehicle according to the present invention.
Figure 7:
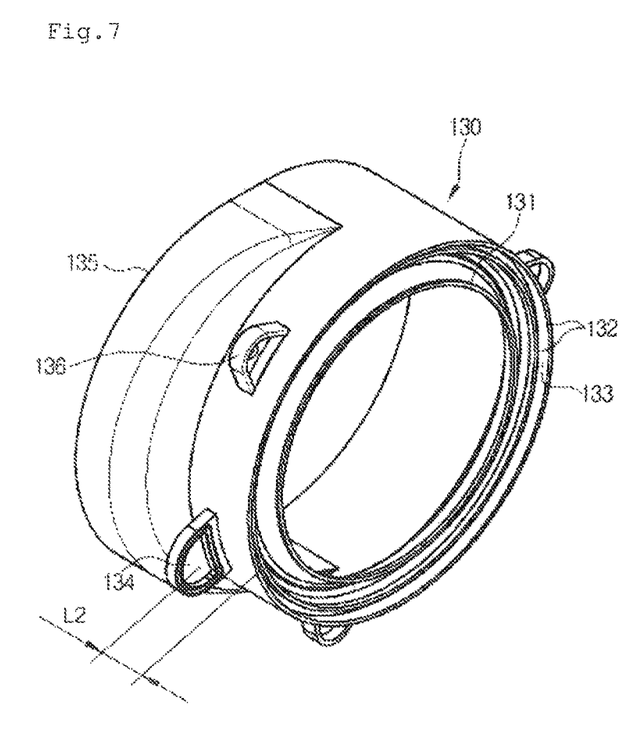
FIG. 7 is a perspective view of the connection cover of the air conditioner for the vehicle according to the present invention.
Figure 8:
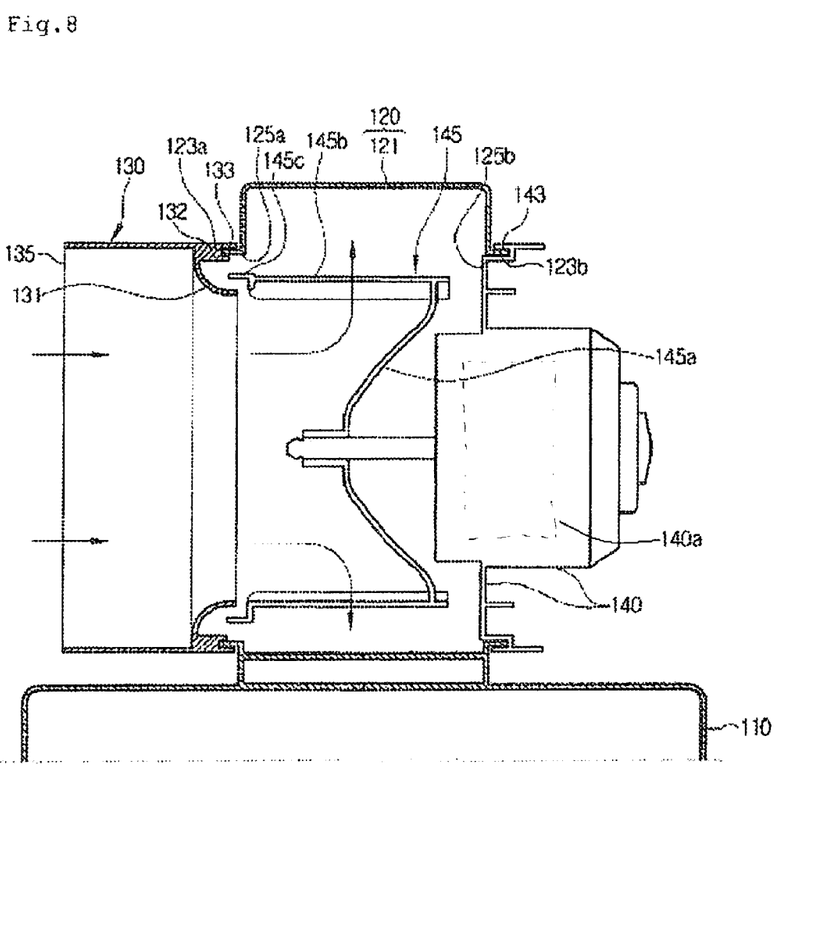
FIG. 8 is a sectional view taken along the line of A-A of FIG. 5.
Figure 9:
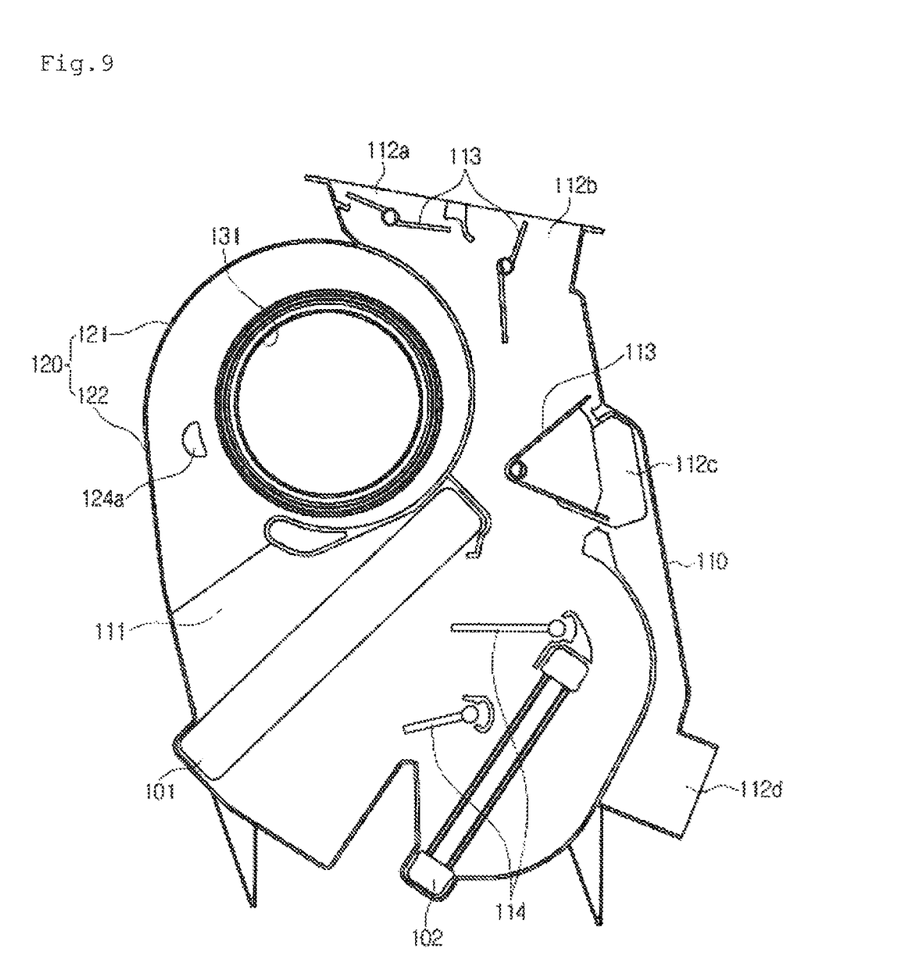
FIG. 9 is a sectional view of the air conditioner for the vehicle according to the present invention.

The center-mounting type air conditioner 1 illustrated in FIG. 1 includes: a scroll case 30 that is disposed on an inlet side thereof and has a centrifugal fan therein; an air-conditioning case 10 that is disposed on an outlet side thereof and has a plurality of air outflow ports 13; an intake duct 20 that is joined to a side of the scroll case 30 and having an inside air port 21 and an outside air port 22 for selectively introducing the inside air or the outside air; a motor housing 35 that is joined to the other side of the scroll case 30 and has a motor mounted therein for driving the centrifugal fan 31; an evaporator 40 and a heater core 50 mounted inside the air-conditioning case 10; at least one temperature control door 15 mounted inside the air-conditioning case 10 to control temperature by adjusting a mixed amount between a cold air bypassing the heater core 50 and a warm air passing through the heater core 50; and a plurality of mode doors 16 adapted to control the degree of opening of the plural air outflow ports 13.

Accordingly, when the centrifugal fan 31 is actuated, the inside air or the outside air are sucked through the intake duct 20, and the sucked air is discharged in a radial direction of the centrifugal fan 31 and moved along the scroll case 30, and then, is blown to the inside of the air-conditioning case 10.

The air blown to the inside of the air-conditioning case 10 is cooled while passing through the evaporator 40, and after that, by the temperature control door 15, some of the air bypasses the heater core 50 in a cooled state but the other of the air passes through the heater core 50 to thereby converted into warm air. After that, the cold air and the warm air are mixed in a mixing area, and then, is discharged to the inside of the vehicle through the air outflow ports 13, so that the inside temperature of the vehicle can be controlled appropriately.

Such center-mounting type air conditioners 1 are divided into air conditioners for RHDs (Right Handle Drives) and air conditioners for LHDs (Left Handle Drives). In other words, the intake duct 20 joined to one side of the scroll case 30 is aligned toward the passenger seat where there is no interference of a handle or a pedal.

As described above, in case of the RHD, the intake duct 20 is designed to be joined to the left (in the direction of the passenger seat) of the scroll case 30, but in case of the LHD, the intake duct 20 is designed to be joined to the right (in the direction of the passenger seat) of the scroll case 30.

However, the conventional center-mounting type air conditioners 1 have a problem in that investment costs, development expenses, and the development period of time are increased due to the double development because it is difficult that the center-mounting type air conditioners are used commonly in the RHDs and the LHDs and the air conditioners for the RHDs and the air conditioner for the LHDs must be developed separately.

SUMMARY OF THE INVENTION

Accordingly, the present invention has been made to solve the above-mentioned problems occurring in the prior arts, and it is an object of the present invention to provide an air conditioner for a vehicle, which includes coupling portions formed on both sides of a scroll case, a connection cover coupled to one coupling portion and having an inlet ring and a dual ring, a motor housing coupled to the other coupling portion of the scroll case, air holes respectively formed on faces at the same height as both sides of a discharge part of the scroll case, and a blocking portion formed on the connection cover to close one of the air holes, so that the air conditioner can reduce investment costs, development expenses and the development period of time because all parts excepting an intake duct can be used commonly in RHDs (Right Handle Drives) and LHDs (Left Handle Drives) and can reduce a loss of air volume because air holes for cooling a motor are formed at positions to minimize resistance of the air discharged from a scroll case.

To accomplish the above object, according to the present invention, there is provided an air conditioner for a vehicle including: a scroll case disposed at an inlet of an air-conditioning case and having through holes formed on both sides thereof; a centrifugal fan rotatably mounted inside the scroll case; an intake duct aligned on one side of the scroll case in an axial direction of the centrifugal fan for selectively introducing the inside air or the outside air; a motor housing coupled to the other side of the scroll case in the axial direction of the centrifugal fan and having a motor mounted therein for rotating the centrifugal fan; a connection cover coupled to one side of the scroll case for connecting the intake duct and the scroll case with each other; and coupling portions formed on circumferences of the through holes of the scroll case to selectively couple the connection cover and the motor housing to the scroll case, wherein positions of the connection cover and the motor housing mounted on both sides of the scroll case can be exchanged with each other according to right handle drives or left handle drives.

According to the present invention, the air conditioner for the vehicle includes the coupling portions formed on both sides of the scroll case, the connection cover coupled to one coupling portion and having an inlet ring and a dual ring, the motor housing coupled to the other coupling portion of the scroll case, air holes respectively formed on faces at the same height as both sides of a discharge part of the scroll case, and a blocking portion formed on the connection cover to close one of the air holes, so that the air conditioner can reduce investment costs, development expenses and the development period of time because all parts excepting an intake duct can be used commonly in RHDs (Right Handle Drives) and LHDs (Left Handle Drives).

Moreover, the air holes are formed at positions inside the scroll case to minimize resistance to discharge pressure generated by rotation of the centrifugal fan and also formed on the faces at the same height as both sides of the discharge part gradually expanded, and hence, it can minimize resistance of the air discharged from the scroll case to thereby reduce a loss of air volume.

Furthermore, the inlet ring and the dual ring are formed integrally at one end portion of the connection cover to prevent that the air blown in the radial direction of the centrifugal fan is re-introduced into the centrifugal fan and to prevent a noise which may be generated due to a collision between the air re-introduced into the centrifugal fan and the air introduced into the centrifugal fan through the inlet ring.

Additionally, because the air holes of the scroll case, the blocking portion of the connection cover, and an inlet of the communication part of the motor housing are formed in a straight line, the air conditioner can be used commonly not only in the LHDs and the RHDs by exchanging the positions of the connection cover and the motor housings with each other.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiment of the present invention with reference to the attached drawings.

An air conditioner 100 for a vehicle according to the present invention includes: an air-conditioning case 110, a scroll case 120, a connection cover 130, an intake duct 150, a centrifugal fan 145, a motor housing 140, and an evaporator 101 and a heater core 102 that are mounted on an inside air passageway of the air-conditioning case 110.

The air-conditioning case 110 has an inlet 111 formed at one side thereof and a plurality of outlets formed at the other side thereof. In this instance, the inlet 111 of the air-conditioning case 110 is connected with a discharge part 122 of the scroll case 120, and the outlets are divided into a defrost vent 112a for discharging air toward the front window of the vehicle, a face vent 112b for discharging air toward a passenger's face, and floor vents 112c and 112d for discharging air toward the passenger's feet.

The floor vents 112c and 112d are divided into a front seat floor vent 112c for discharging air toward the feet of the passenger, who sits on the front seat, and a rear seat floor vent 112d for discharging air toward the feet of the passenger, who sits on the rear seat.

Moreover, the vents 112a, 112b, 112c and 112d are controlled in the degree of opening by a mode door 113.

Furthermore, the evaporator 101 and the heater core 102 are mounted on the air passageway between the inlet 111 and the outlets of the air-conditioning case 110 in such a way as to be spaced apart from each other at a predetermined interval.

Additionally, between the evaporator 101 and the heater core 102, a temperature control door 114 is mounted to control a mixed amount between cold air bypassing the heater core 102 and warm air passing through the heater core 102.

Meanwhile, the temperature control door 114 and the mode door 113 are directly connected with an actuator mounted on the outer face of the air-conditioning case 110 or are actuated through a driving means 105, such as a cam or a lever, actuated by the actuator (or a wire).

Moreover, the scroll case 120 includes a scroll part 121 and the discharge part 122 and is connected to the inlet 111 of the air-conditioning case 110.

The centrifugal fan 145 is rotatably mounted inside the scroll part 121 of the scroll case 120, and a scroll type air flow channel is formed on the circumference of the centrifugal fan 145 in a gradually expanded form so that the air blown from the centrifugal fan 145 in a radial direction is moved to the discharge part 122 in swirl.

In the meantime, the centrifugal fan 145 has a plurality of vertical wings 145b arranged in a circumferential direction at positions that are spaced apart in the radial direction from the center of rotation at predetermined intervals, the plural vertical wings 145b are connected with a rotary shaft of a motor 140a mounted inside the motor housing 140 through a hub 145a, and end portions of the vertical wings 145b are connected with each other via a band 145c.

Furthermore, the discharge part 122 of the scroll case 120 is gradually expanded from the scroll part 121 and discharges the air moving along the air flow channel, which is formed inside the scroll part 121, to the inlet 111 of the air-conditioning case 110.

In this instance, the discharge part 122 extends in the tangential direction from a point where a scroll form of the scroll part 121 is ended, and the gradually expanded discharge part 122 is connected with the inlet 111 of the air-conditioning case 110.

Moreover, the connection cover 130 is coupled to one side of the scroll case 120 in the axial direction of the centrifugal fan 145 in order to connect the intake duct 150 and the scroll case 120 with each other, and the motor housing 140 having the motor 140a therein is coupled to the other side of the scroll case 120 in order to rotate the centrifugal fan 145.

That is, an end portion of the connection cover 130 is coupled to one side of the scroll case 120, and the other end portion is coupled to the intake duct 150.

Meanwhile, the scroll case 120 has through holes 125a and 125b that are respectively formed on both sides of the scroll case 120 and are concentric to a rotary axis of the centrifugal fan 145.

Additionally, the scroll case 120 has coupling portions 123a and 123b formed on peripheral surfaces of the through holes 125a and 125b formed on both sides of the scroll case 120 in the axial direction of the centrifugal fan 145, so that the connection cover 130 and the motor housing 140 can be selectively coupled thereto.

In this instance, it is preferable that the coupling portions 123a and 123b protrude from both sides of the scroll case 120 and the protruding lengths are the same.

In addition, the connection cover 130 coupled to the scroll case 120 includes an inlet ring 131 formed on an end portion thereof to guide the inside air or the outside air introduced through the intake duct 150 to the inside of the centrifugal fan 145; and a dual ring 132 formed on the circumference of the inlet ring 131 and coupled with the coupling portion 123a of the scroll case 120 to prevent a re-introduction of the air, which is blown in the radial direction from the centrifugal fan 145, to the centrifugal fan 145.

The inlet ring 131 extends from the inner circumferential surface of the connection cover 130 in the inward direction of the centrifugal fan 145 in a curved form that has a predetermined radius.

The dual ring 132 is doubly formed on the circumference of the inlet ring 131 and spaced at a predetermined interval, and has a coupling groove 133 formed on an end portion thereof so that an end portion of the coupling portion 123a can be inserted and joined thereto.

As described above, the inlet ring 131 and the dual ring 132 of the connection cover 130 surround the inside and the outside of the front end portion of the centrifugal fan 145 in a state where they are spaced apart from each other at a predetermined interval.

In other words, the inlet ring 131 and the dual ring 132 spaced apart from each other at the predetermined interval surround the inside and the outside of the band 145c formed at the end portions of the vertical wings 145b.

Accordingly, when the centrifugal fan 145 rotates, the dual ring 132 prevents that the air blown in the radial direction of the centrifugal fan 145 is re-introduced into the centrifugal fan 145, and thereby, it can also prevent a noise which may be generated due to a collision between the air re-introduced into the centrifugal fan 145 and the air introduced into the centrifugal fan 145 through the inlet ring 131.

Additionally, the inlet ring 131 and the dual ring 132 formed on one end portion of the connection cover 130 are formed in a circular shape, and an intake duct coupling portion 135 formed on the other end portion of the connection cover 130 for coupling between the intake duct 150 and the connection cover 130 is formed in anon-circular shape.

In this instance, the centers (C1) of the inlet ring 131 and the dual ring 132 formed in the circular shape and the center (C2) of the intake duct coupling portion 135 formed in the non-circular shape are formed eccentrically.

Meanwhile, the connection cover 130 has a plurality of projections 136 formed on the outer circumferential surface of the connection cover 130 for screw-coupling with the scroll case 120.

Moreover, the motor housing 140 includes: the motor 140a mounted therein to rotate the centrifugal fan 145; and a coupling groove 143 formed on the circumference of the motor housing 140 and coupled with the coupling portion 123b formed on the other side of the scroll case 120.

As described above, when the coupling groove 143 formed on the other side of the motor housing 140 is coupled to the coupling portion 123b of the scroll case 120, a perforated portion formed inside the coupling portion 123b is closed by the motor housing 140 at the other side of the scroll case 120.

Furthermore, the scroll case 120 further includes air holes 124a and 124b respectively formed at both sides thereof to take out some of the air flowing inside the scroll case 120 to cool the motor 140a mounted inside the motor housing 140.

The air holes 124a and 124b are formed symmetrically to each other at both sides of the discharge part 122 of the scroll case 120.

In this instance, because the discharge part 122 of the scroll case 120 is gradually expanded in the air discharge direction, the air holes 124a and 124b are formed on the same face as the gradually expanded sides of the discharge part 122, namely, on the face at the same height as both sides of the gradually expanded discharge part 122.

Additionally, the air holes 124a and 124b are formed adjacent to the boundary between, the scroll part 121 and the discharge part 122 in such a fashion as to be in contiguity with the front end (the upstream side of the air flow direction) of the gradually expanded discharge part 122 as close as possible.

As set forth, because the air holes 124a and 124b are formed at the positions inside the scroll case 120 to minimize resistance to discharge pressure generated by the rotation of the centrifugal fan 145 and also formed at the same height as the both sides of the gradually expanded discharge part 122, it can minimize resistance to the air discharged from the scroll case 120 to thereby reduce a loss of air volume.

In addition, for common use of the air conditioner in the LHD (Left Handle Drive) and the RHD (Right Handle Drive), the connection cover 130 includes blocking portions 134 adapted for closing one air hole 124a of the air holes 124a and 124b formed at both sides of the scroll case 120.

In this instance, the blocking portion 134 is formed at an end portion of the connection cover 130 in a stepped form. That is, because one end portion of the connection cover 130 is joined to a side of the scroll part 121 of the scroll case 120 and the air holes 124a and 124b are formed at the same height as both sides of the discharge part 122 gradually expanded from the scroll part 121, the blocking portion 134 for closing the air holes 124a or 124b is also formed at the end portion of the connection cover 130 in the stepped form in correspondence to the height of the air holes 124a or 124b.

As described above, because the positions of the connection cover 130 and the motor housing 140 coupled to both sides of the scroll case 120 are varied according to kinds of the vehicles, namely, according to LHDs or RHDs, just the air hole 124b adjacent to the motor housing 140 out of the two air holes 124a and 124b formed at both sides of the scroll case 120 is opened and the air hole 124a adjacent to the connection cover 130 is closed by the blocking portion 134.

In the meantime, the motor housing 140 has a communication part 141 adapted to communicate the inside of the air hole 124b, which is one of the air holes 124a and 124b formed at both sides of the scroll case 120, and the inside of the motor housing 140 with each other.

Therefore, some of the air discharged from the scroll case 120 is flown out through the air hole 124b, and then, supplied to the inside of the motor housing 140 through the communication part 141 to thereby cool the motor 140a mounted inside the motor housing 140.

Moreover, the air holes 124a and 124b of the scroll case 120, the blocking portion 134 of the connection cover 130, and an inlet of the communication part 141 of the motor housing 140 are formed in a straight line.

Here, in order to switch positions of the connection cover 130 and the motor housing 140 on both sides of the scroll case 120, it is preferable that a length (L1) from an end portion of the motor housing 140 to the inlet of the communication part 141 and a length (L2) from an end portion of the connection cover 130 to the blocking portion 134, which are opposed from both sides of the scroll case 120 to each other, are equal to each other.

As described above, because the scroll case 120 has the coupling portions 123a and 123b and the air holes 124a and 124b formed on both sides thereof and the connection cover 130 has the inlet ring 131 and the dual ring 132 formed integrally with each other at one end portion thereof and the blocking portion 134 for closing one of the air holes 124a and 124b, all parts excepting the intake duct 150 can be commonly used not only in the RHDs but also in the LHDs, and hence, the present invention can reduce investment costs, development expenses and development period of time.

In the meantime, the intake duct 150 is joined to the intake duct coupling portion 135 of the connection cover 130, and includes: an inside air port 151 and an outside air port 152 formed at one side thereof to introduce the inside air or the outside air thereinto; and an inside air and outside air converting door 153 rotatably mounted therein to open and close the inside air port 151 and the outside air port 152.

Hereinafter, actions of the air conditioner for the vehicle according to the present invention will be described.

First, an assembling process of the connection cover 130, the motor housing 140, and the intake duct 150 will be described.

The connection cover 130 and the motor housing 140 are respectively screw-coupled to both sides of the scroll case 120 through the projections 136 and 142 formed on the outer circumferential surfaces of the connection cover 130 and the motor housing 140. In this instance, the coupling groove 133 formed on the dual ring 132 of the connection cover 130 is inserted and joined to the coupling portion 123a formed on one side of the scroll case 120, and the coupling groove 143 formed on the motor housing 140 is inserted and joined to the coupling portion 123b formed on the other side of the scroll case 120.

As set forth, when the connection cover 130 and the motor housing 140 are coupled to both sides of the scroll case 120, the blocking portion 134 of the connection cover 130 closes one air hole 124a out of the two air holes 124a and 124b formed on both sides of the scroll case 120, and the communication part 141 formed in the motor housing 140 is joined in such a way as to communicate with the other air hole 124b.

Furthermore, the intake duct 150 is coupled to the intake duct coupling portion 135 of the connection cover 130.

Additionally, because the intake duct 150 must be located in the opposite direction of a handle relative to the air-conditioning case 110 according to LHDs or RHDs, the air conditioner according to the present invention can be commonly used for the LHDs and the RHDs just by exchanging the positions of the connection cover 130 and the motor housing 140 joined to both sides of the scroll case 120.

In this instance, because the air holes 124a and 124b of the scroll case 120, the blocking portion 134 of the connection cover 130, and the inlet of the communication part 141 of the motor housing 140 are locate in a straight line, the air conditioner according to the present invention can be commonly used for the LHDs and the RHDs even though the positions of the connection cover 130 and the motor housing 140 are exchanged.

Of course, the intake duct 150 joined to the connection cover 130 must be differently manufactured according to the LHDs or RHDs because it cannot be used commonly.

As described above, all parts of the air conditioner excepting the intake duct 150 can be used commonly.

Hereinafter, an air flow process of the air conditioner for the vehicle according to the present invention will be described.

When the centrifugal fan 145 is rotated by the motor 140a, low pressure is formed inside the centrifugal fan 145 by the rotation of the centrifugal fan 145, and hence, the inside air or the outside air is sucked into the intake duct 150 through the inside air port 151 and the outside air port 152 by the inside and outside air converting door 153. The sucked air is guided along the inlet ring 131 of the connection cover 130 to the inside of the centrifugal fan 145, and then, is blown in the radial direction of the centrifugal fan 145.

Continuously, the air blown in the radial direction of the centrifugal fan 145 is blown to the inside of the air-conditioning case 110 while moving along the inside of the scroll case 120 in the scroll type.

In this instance, some of the air blown to the inside of the air-conditioning case 110 while moving along the inside of the scroll case 120 is taken out through the air hole 124b connected with the communication part 141 of the motor housing 140 and is supplied to the inside of the motor housing 140 to cool the motor 140a of the motor housing 140.

Continuously, the air blown to the inside of the air-conditioning case 110 is selectively cooled while passing through the evaporator 101 according to the cooling mode and the heating mode. After that, the air flows in a cold air state by bypassing the heater core 102 by the temperature control door 114 or flows in a warm air state by passing through the heater core 102.

The air converted into the warm air or the cold air is discharged to the inside of the vehicle through the vents (112a, 112b, 112c, and 112d) selectively opened by the mode door 113 according to various air-conditioning modes (a defrost mode, a face mode, a floor mode, a mix mode, a bi-level mode, and so on), so that the inside of the vehicle can be cooled or heated.

What is claimed is:

1. An air conditioner for a vehicle comprising:
a scroll case having two side walls, wherein the scroll case is disposed at an inlet of an air-conditioning case with openings respectively formed on both side walls thereof;
a centrifugal fan rotatably mounted inside the scroll case;

an intake duct aligned on one side of the scroll case in an axial direction of the centrifugal fan for selectively introducing the inside air or the outside air;

a motor housing coupled to the other side of the scroll case in the axial direction of the centrifugal fan and having a motor mounted therein for rotating the centrifugal fan;

a connection cover coupled to one side of the scroll case for connecting the intake duct and the scroll case with each other; and coupling portions formed on circumferences of the openings of the scroll case to selectively couple the connection cover and the motor housing to the scroll case, wherein positions of the connection cover and the motor housing mounted on both sides of the scroll case can be exchanged with each other according to right handle drives or left handle drives, wherein the scroll case includes air holes respectively formed on both side walls thereof for taking out some of the air flowing inside the scroll case to cool the motor of the motor housing, wherein the air holes are connected by a cylindrical passageway through the scroll case, wherein the connection cover includes a blocking portion formed on the outer circumferential surface thereof to close one of the air holes.

2. The air conditioner according to claim 1, wherein the scroll case includes: a scroll part that forms an air flow channel of a scroll type on the circumference of the centrifugal fan; and a discharge part extending from the scroll part in a gradually expanded form and adapted to discharge the air flowing along the air flow channel toward the inlet of the air-conditioning case, and characterized in that the air holes are formed symmetrically on both sides of the discharge part of the scroll case.

3. The air conditioner according to claim 2, wherein the air holes are formed adjacent to a boundary between the scroll part and the discharge part of the scroll case.

4. The air conditioner according to claim 1, wherein the blocking portion is formed at an end portion of the connection cover in a stepped form.

5. The air conditioner according to claim 1, wherein the motor housing includes a communication part adapted to communicate one of the air holes with the inside of the motor housing.

6. The air conditioner according to claim 5, wherein the air holes of the scroll case, the blocking portion of the connection cover, and an inlet of the communication part of the motor housing are formed in a straight line.

7. The air conditioner according to claim 5, wherein a length from an end portion of the motor housing to an inlet of the communication part and a length from an end portion of the connection cover to the blocking portion, which are opposed from both sides of the scroll case to each other, are equal to each other.

8. The air conditioner according to claim 1, wherein the coupling portions respectively protrude from both sides of the scroll case and the protruding lengths of the coupling portions are the same.

9. The air conditioner according to claim 1, wherein the connection cover includes: an inlet ring formed on an end portion thereof to guide the inside air or the outside air introduced through the intake duct to the inside of the centrifugal fan; and a dual ring formed on the circumference of the inlet ring and adapted to prevent a re-introduction of the air, which is blown in the radial direction from the centrifugal fan, to the centrifugal fan.

10. The air conditioner according to claim 9, wherein a coupling groove is formed on an end portion of the dual ring of the connection cover for inserting and coupling an end portion of the coupling portion thereto.

11. The air conditioner according to claim 9, wherein the inlet ring and the dual ring formed on one end portion of the connection cover are formed in a circular shape, an intake duct coupling portion formed on the other end portion of the connection cover to be coupled with the intake duct is formed in a non-circular shape, and the centers of the inlet ring and the dual ring and the center of the intake duct coupling portion are formed eccentrically.

12. The air conditioner according to claim 9, wherein the inlet ring and the dual ring of the connection cover surround the inside and the outside of the front end portion of the centrifugal fan in a state where they are spaced apart from each other at a predetermined interval.

13. The air conditioner according to claim 1, wherein the motor housing includes a coupling groove formed on the circumference thereof to be coupled with the coupling portion formed on the other side of the scroll case.

* * * * *